US008641891B1

(12) United States Patent
Crowder (10) Patent No.: US 8,641,891 B1
(45) Date of Patent: Feb. 4, 2014

(54) MULTI-CHAMBERED CONTAINER (76) Inventor: Bryon Paul Crowder, Yarmouth, ME (US)

( * ) Notice: Subject to any disclaimer, the term of this patent is extended or adjusted under 35 U.S.C. 154(b) by 479 days.

(21) Appl. No.: 12/683,920

(22) Filed: Jan. 7, 2010

(51) Int. Cl.
*B01D 27/08* (2006.01)

(52) U.S. Cl.
USPC ........... 210/136; 210/282; 210/767; 210/469; 215/6; 222/189.06; 222/207; 222/210; 222/213

(58) Field of Classification Search
USPC .............. 215/6; 210/282, 136, 767, 244, 464, 210/469, 478–479, 473–475; 222/158, 222/189.06, 189.07, 206–215
See application file for complete search history.

(56) References Cited

U.S. PATENT DOCUMENTS

| 703,654 | A | * | 7/1902 | Hall ........................ 222/189.11 |
| 5,122,272 | A | | 6/1992 | Iana et al. |
| 5,431,813 | A | | 7/1995 | Daniels |
| 5,692,945 | A | * | 12/1997 | Crowell et al. ............... 446/183 |
| 5,840,185 | A | | 11/1998 | Hughes et al. |
| 5,928,512 | A | * | 7/1999 | Hatch et al. ................... 210/266 |
| 6,022,134 | A | * | 2/2000 | Andrews ....................... 366/130 |
| 6,153,096 | A | | 11/2000 | Nonren |
| 6,193,886 | B1 | | 2/2001 | Nohren, Jr. |
| 6,290,102 | B1 | * | 9/2001 | Jennings et al. .............. 222/158 |
| 6,395,170 | B1 | | 5/2002 | Hughes et al. |
| 6,450,351 | B1 | | 9/2002 | Thompson |
| 6,517,878 | B2 | | 2/2003 | Heczko |
| 6,520,070 | B1 | | 2/2003 | Heczko |
| 6,622,615 | B2 | | 9/2003 | Heczko |
| 6,814,229 | B2 | | 11/2004 | Seckler |
| 7,585,409 | B2 | * | 9/2009 | Bommi et al. ................ 210/120 |
| 2005/0252850 | A1 | | 11/2005 | Ali |
| 2007/0278174 | A1 | | 12/2007 | Kunz et al. |
| 2008/0011779 | A1 | | 1/2008 | Klima et al. |

OTHER PUBLICATIONS

"Kautex Graduated Leak-Proof Plastic Bottles—Freund Container," Freund Container & Supply http://www.freundcontainer.com/product.asp?splid=SPLID02&pn=3 . . . , printed on Dec. 3, 2008.
"Save at RV Partscenter—RV Parts and Supply," CD RV Parts Center, http://rvpartscenter.com/ProductDetail.asp?CID=450&DID=21 &PID . . . , printed on Dec. 4, 2008.

* cited by examiner

*Primary Examiner* — Terry Cecil
(74) *Attorney, Agent, or Firm* — Bay State IP, LLC (57) ABSTRACT

A multi-chambered container, which reduces backflow and which can include a filter to remove contaminants from a beverage, a first chamber having a first opening disposed adjacent to a top of the container through which fluid enters the first chamber and a second opening disposed adjacent to a bottom of the container through which fluid flows out of the first chamber, a second chamber having a third opening disposed adjacent to the top through which fluid enters the second chamber and a fourth opening disposed adjacent to the top through which fluid is dispensed from the second chamber, and a fluid conduit connecting the second opening of the first chamber to the third opening of the second chamber.

12 Claims, 15 Drawing Sheets

MULTI-CHAMBERED CONTAINER

FIELD OF INVENTION

The invention relates to a multi-chambered container, and in particular, a container for storing and dispensing fluids such as beverages for drinking.

BACKGROUND

Many drinking bottles have a single chamber for holding a beverage fluid. As a result, during consumption of a beverage by a user, backwash can easily flow into the bottle and contaminate the remaining fluid with biological agents. Such backflow potentially contains microbes, enzymes, and other biologically active agents, which can contaminate a beverage and reduce its drinkability. For example, bacteria can grow in beverages, particularly beverages that contain sugar and other nutrients. Consequently, if the remaining beverage is not consumed relatively quickly, it can spoil or become unsafe to drink.

SUMMARY

The present invention provides multi-chambered containers that can be used for fluids to reduce contamination or spoilage caused by backflow during beverage consumption. By reducing backflow, the multi-chambered containers of the present invention provide cleaner, safer containers and prolong the life of a beverage.

The present invention also provides multi-chambered containers that include filters, which remove contaminants from beverages such as water, enabling a user to fill the bottle from public or other water sources that may contain distasteful or unsafe contaminants.

In general, in one aspect, the invention features a multi-chambered container having a top and a bottom. A first chamber has a first opening disposed adjacent to the top through which fluid enters the first chamber and a second opening disposed adjacent to the bottom through which fluid flows out of the first chamber. A second chamber has a third opening disposed adjacent to the top through which fluid enters the second chamber and a fourth opening disposed adjacent to the top through which fluid is dispensed from the second chamber. A fluid conduit connects the second opening of the first chamber to the third opening of the second chamber. Fluid flows out of the first chamber and enters the second chamber upon pressurization of the first chamber.

Embodiments of the invention may include one or more of the following features. The multi-chambered container may include a filter disposed in the third opening of the second chamber. The multi-chambered container may include a holding mechanism for retaining the filter in the third opening of the second chamber. The second chamber of the multi-chambered container may be smaller than the first chamber, the fluid conduit disposed between the first chamber and the second chamber, and the second chamber configured to form a graspable handle for the container. The fluid conduit may be substantially straight or may include at least one bend. The multi-chambered container may include a first removable cap for covering the first opening of the first chamber. The multi-chambered container may include a second removable cap for covering the fourth opening of the second chamber, which may be a squirt cap. The container may be made from a material comprising plastic.

In general, in another aspect, the invention features a method for reducing backflow of a liquid into a container. A multi-chambered container having a top and a bottom is provided. The container includes a first chamber having a first opening disposed adjacent to the top through which fluid enters the first chamber and a second opening disposed adjacent to the bottom through which fluid flows out of the first chamber, a second chamber having a third opening disposed adjacent to the top through which fluid enters the second chamber and a fourth opening disposed adjacent to the top through which fluid is dispensed from the second chamber, and a fluid conduit connecting the second opening of the first chamber to the third opening of the second chamber. The first chamber is pressurized to cause fluid in the first chamber to flow through the conduit into the second chamber, and the liquid is dispensed through the fourth opening of the second chamber.

Embodiments of the invention may include one or more of the following features. The pressurizing may include squeezing the first chamber or pumping the first chamber. Fluid may be introduced into the first chamber through the first opening.

This Summary is provided merely to introduce certain concepts and not to identify any key or essential features of the claimed subject matter.

BRIEF DESCRIPTION OF DRAWINGS

The figures are not necessarily to scale, emphasis instead generally being placed upon illustrative principles. The figures are to be considered illustrative and non-exhaustive in all aspects and are not intended to limit the invention, the scope of which is defined only by the claims. In the drawings, like numerals are used to indicate like parts throughout the various views.

DETAILED DESCRIPTION

The present invention relates to containers having multiple chambers. A first or main chamber of the multi-chambered container is the primary vessel for containing a fluid or beverage, and a second or metered chamber is the primary vessel from which a user may dispense the fluid or beverage. A fluid conduit or channel connects the first chamber to the second chamber. The fluid conduit is configured to permit beverage flow from the first fluid chamber into the second fluid chamber and to minimize fluid flow from the second fluid chamber back into the first fluid chamber. When a user takes a drink, i.e., dispenses fluid from the second chamber, backflow or backwash into the second chamber is isolated from and does not contaminate fluid remaining in the first chamber. As a result, the multi-chambered container is more sanitary and allows a user to save unused beverage for later consumption with reduced concern that the beverage will spoil or be contaminated. In addition, the multi-chambered container can include one or more filters, which remove contaminants such as chlorine and bacteria from a beverage such as water.

Figure 1:
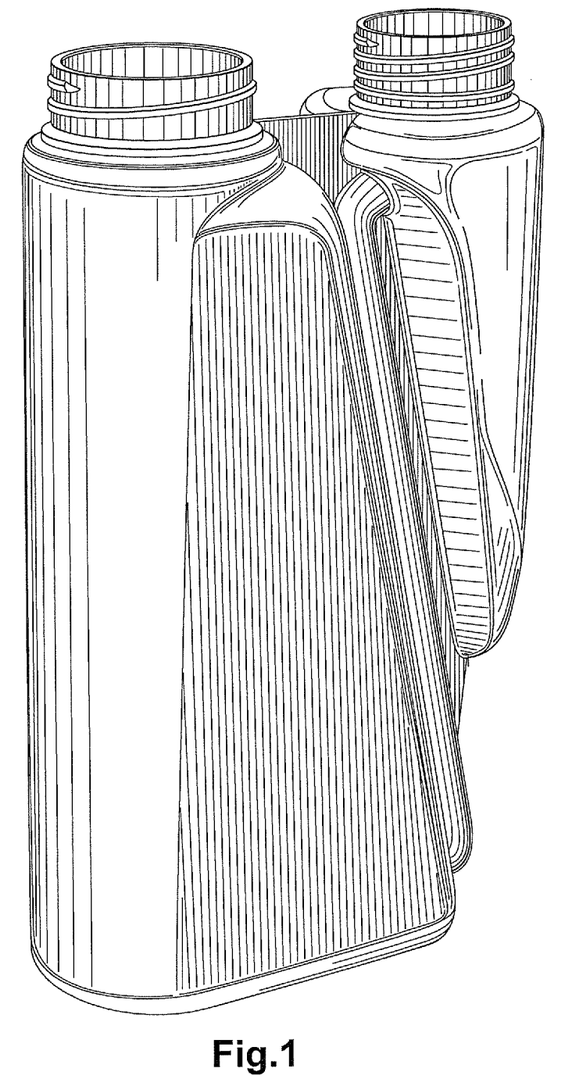
FIG. 1 shows a perspective view of a multi-chambered container according to an embodiment of the present invention having a straight fluid conduit.
Figure 2:
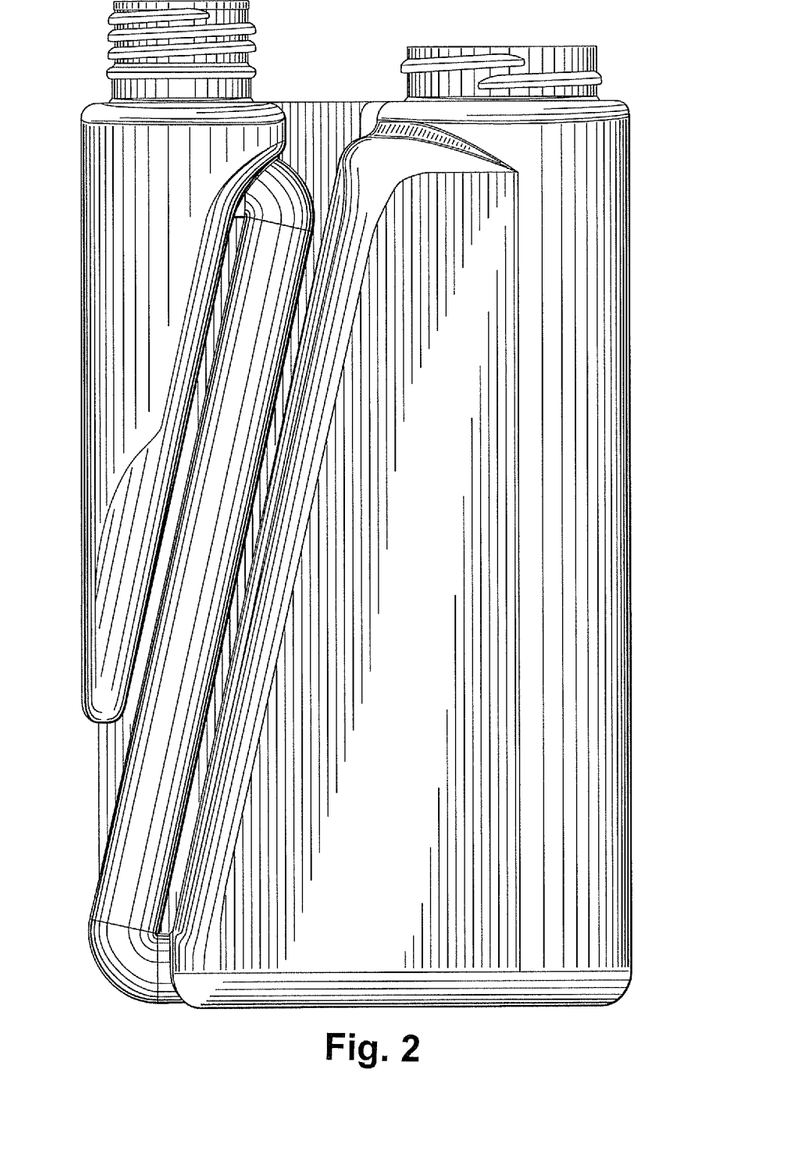
FIG. 2 shows a side plan view of a first side of the container of FIG. 1.
Figure 3:
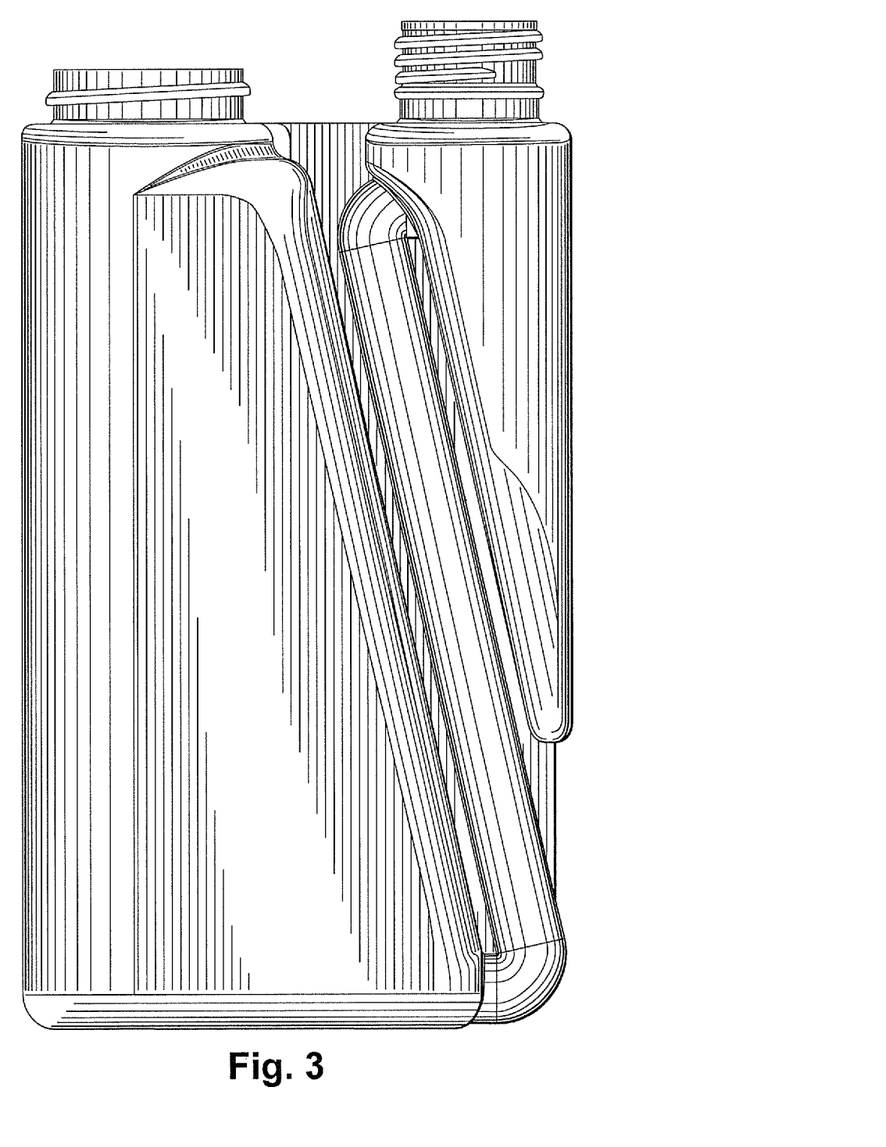
FIG. 3 shows a side plan view of a second side of the container of FIG. 1.
Figure 4:
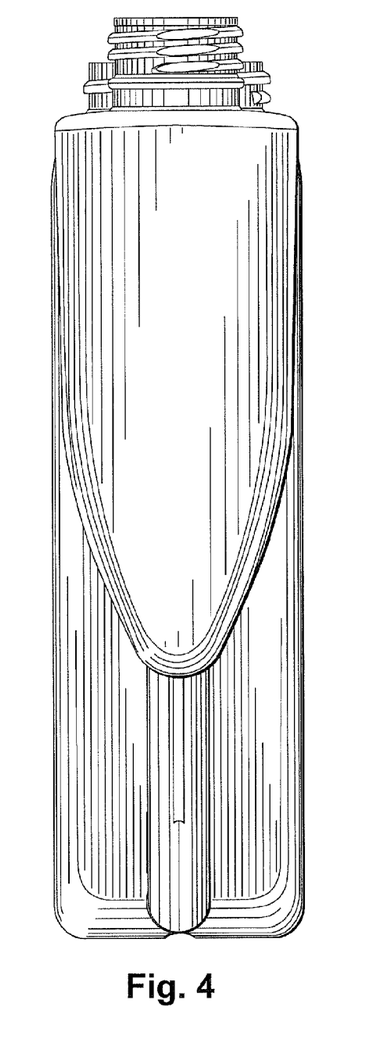
FIG. 4 shows an end plan view of a first end of the container of FIG. 1.
Figure 5:
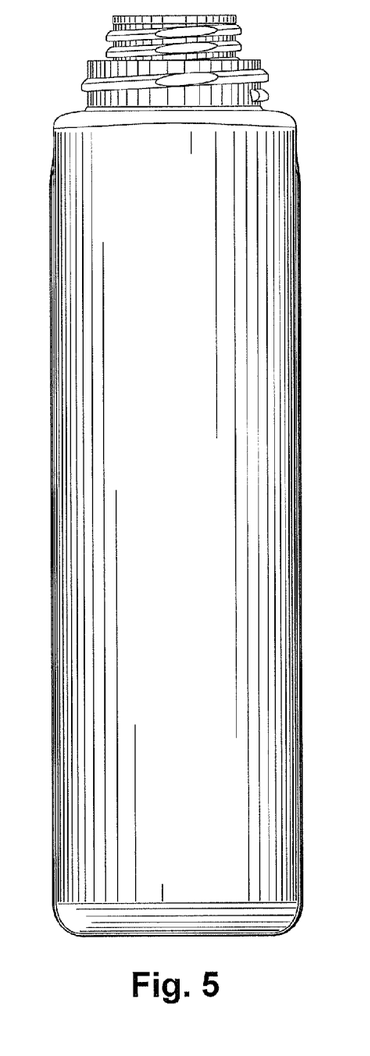
FIG. 5 shows an end plan view of a second end of the container of FIG. 1.
Figure 6:
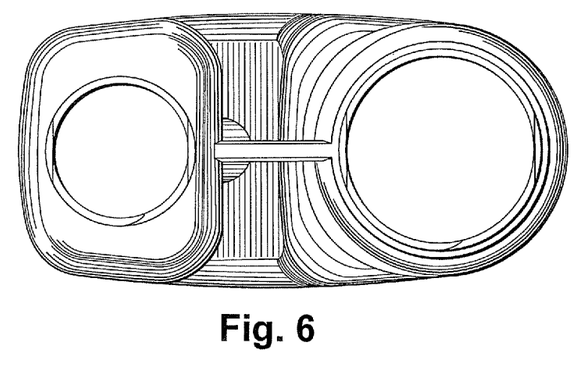
FIG. 6 shows a top plan view of the container of FIG. 1.
Figure 7:
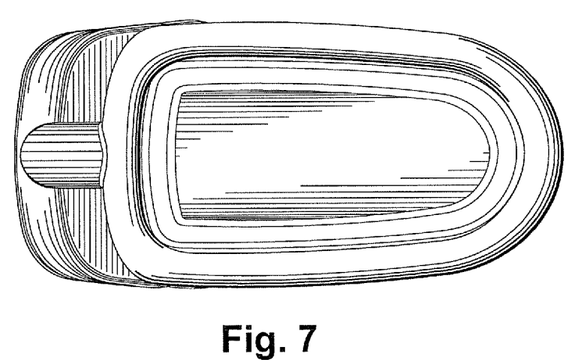
FIG. 7 shows a bottom plan view of the container of FIG. 1.
Figure 8:
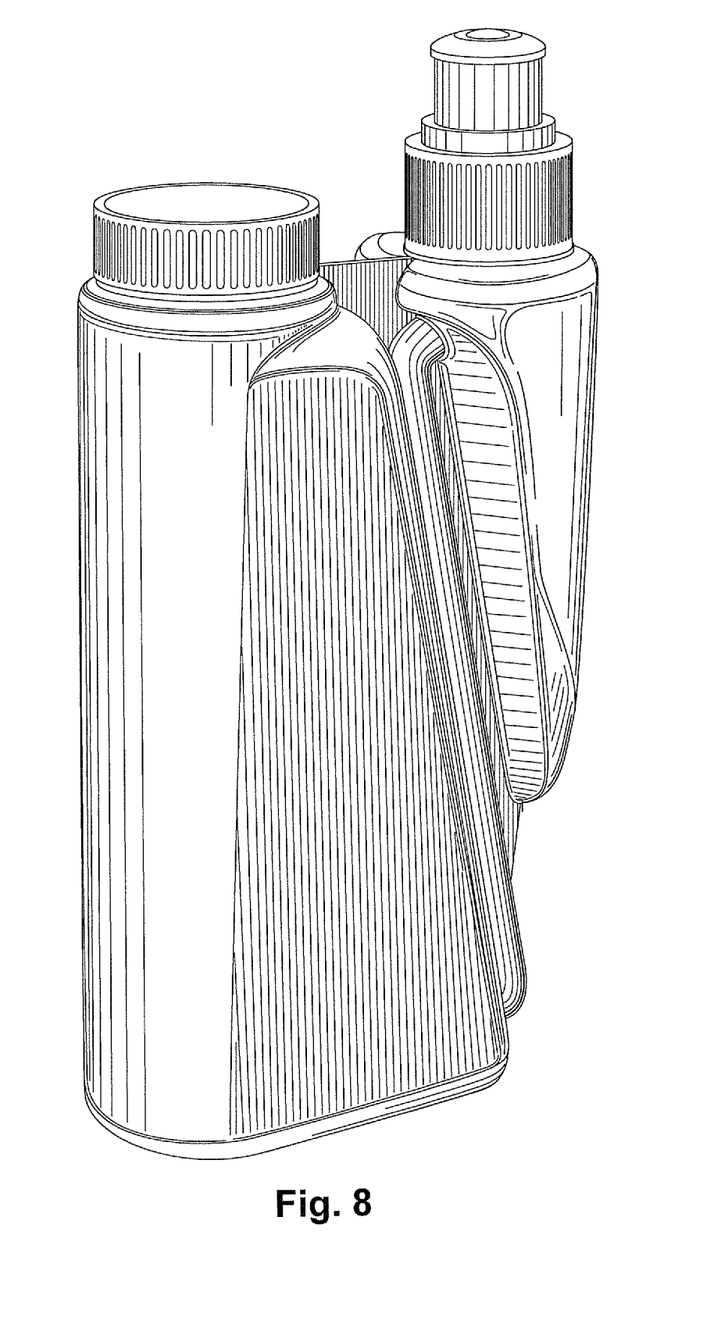
FIG. 8 shows a perspective view of the container of FIG. 1 with caps disposed thereon.
Figure 9:
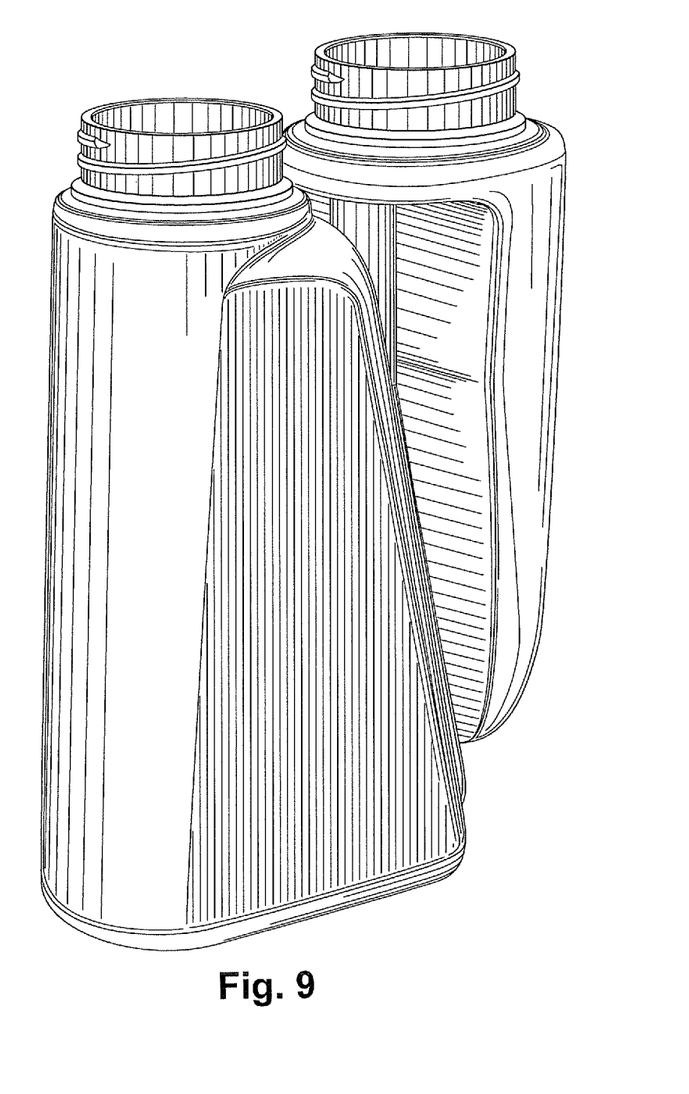
FIG. 9 shows a perspective view of a multi-chambered container according to an embodiment of the present invention having an angled fluid conduit.
Figure 10:
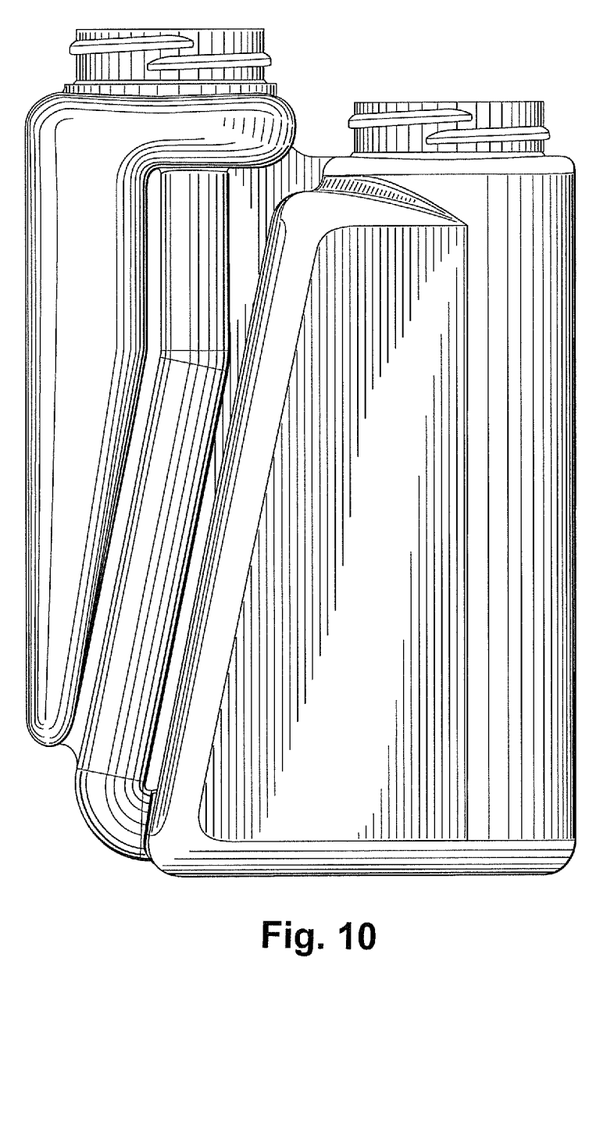
FIG. 10 shows a side plan view of a first side of the container of FIG. 9.
Figure 11:
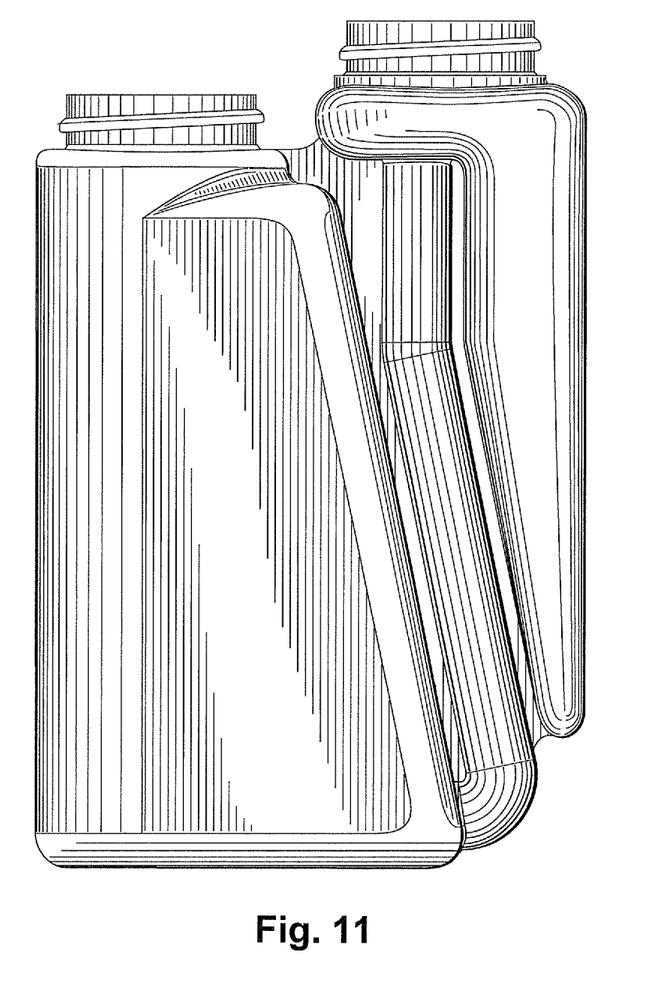
FIG. 11 shows a side plan view of a second side of the container of FIG. 9.
Figure 12:
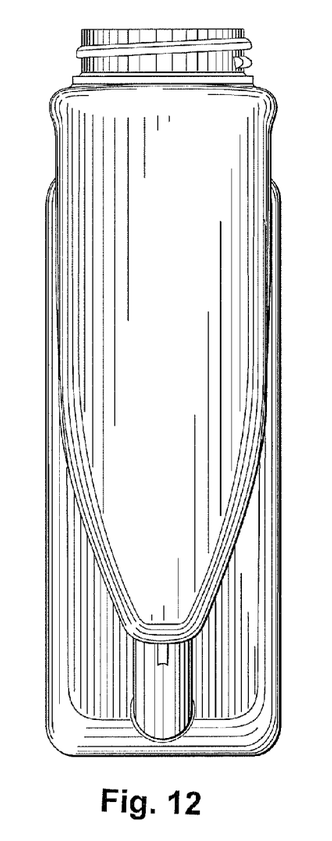
FIG. 12 shows an end plan view of a first end of the container of FIG. 9.
Figure 13:
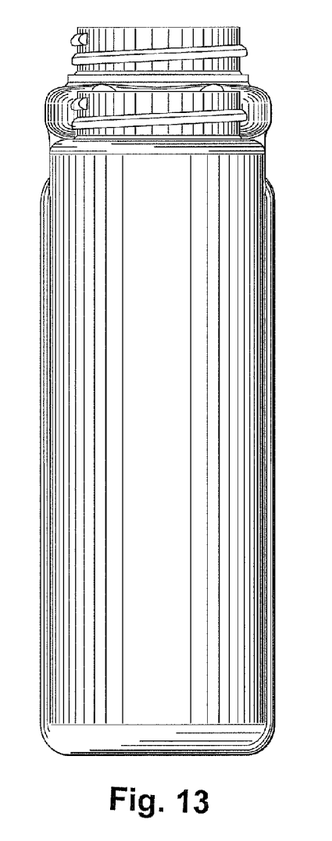
FIG. 13 shows an end plan view of a second end of the container of FIG. 9.
Figure 14:
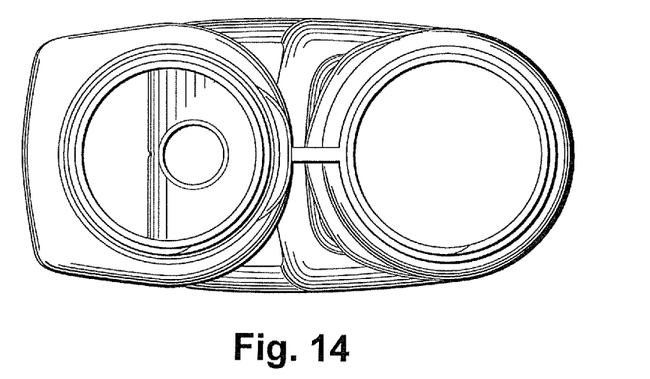
FIG. 14 shows a top plan view of the container of FIG. 9.
Figure 15:
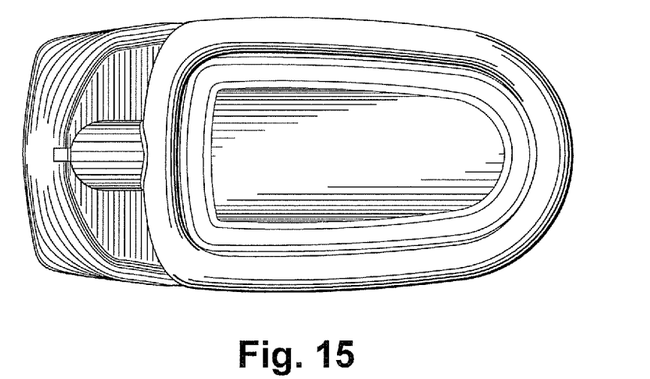
FIG. 15 shows a bottom plan view of the container of FIG. 9.
Figure 16:
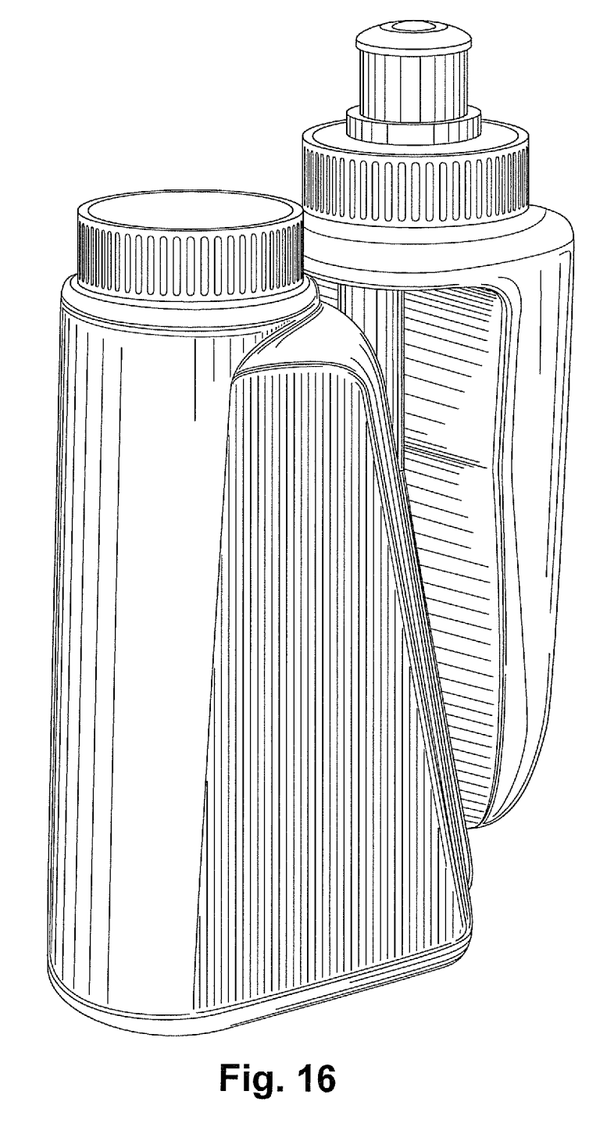
FIG. 16 shows a perspective view of the container of FIG. 9 with caps disposed thereon.
Figure 17:
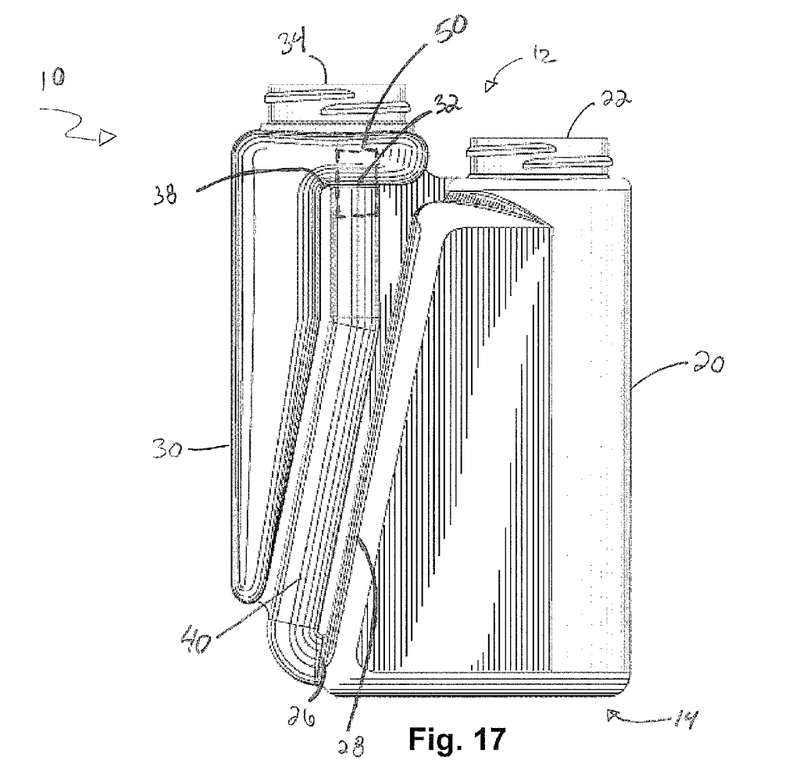
FIG. 17 shows a side plan view of a multi-chambered container according to an embodiment of the present invention having an angled fluid conduit.
Figure 19:
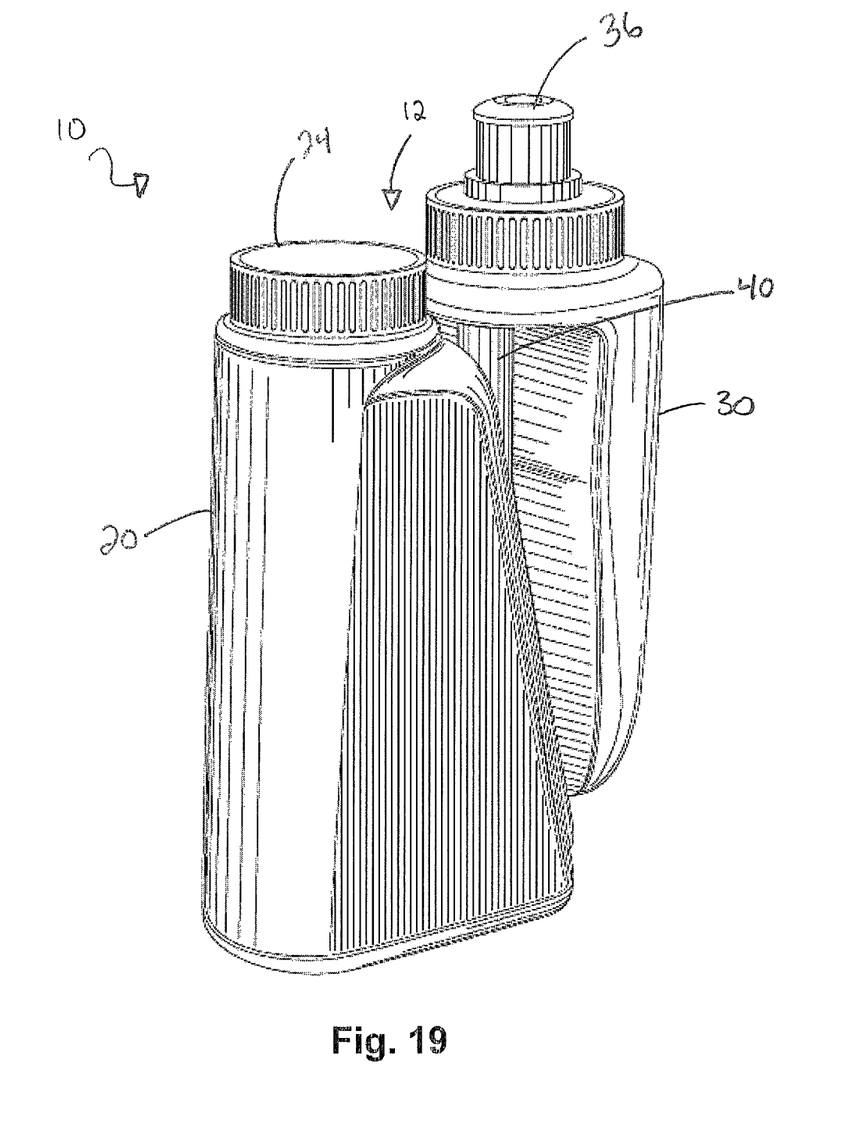
FIG. 19 shows a perspective view of the container of FIG. 17 with caps disposed thereon.

Referring to FIG. 17, in accordance with an illustrative embodiment, a multi-chambered container 10 having two chambers is shown. Multi-chambered container 10 has a top 12 and a bottom 14. A first chamber 20 can hold a fluid such as a beverage. The first chamber 20 may have a flat bottom for resting container 10 on a surface, such as a desk or table. Fluid is added to the first chamber through an opening 22 adjacent to, i.e., disposed at or near, the top 12. The opening 22 may have a removable cap 24 such as a screw cap (FIG. 19). Fluid flows out of first chamber 20 through an opening 26 near the bottom 14, which in some embodiments is an opening in a sidewall 28 of first chamber 20.

With further reference to FIG. 17, the multi-chambered container 10 has a second chamber 30 for dispensing fluid, e.g., to a user. Fluid is dispensed through an opening 34 adjacent to the top 12. The opening 34 can have a removable cap 36 such as a screw cap, squirt cap or straw to facilitate dispensing or drinking. Fluid flows into second chamber 30 through an opening 32 adjacent to the top 12, which in some embodiments is in a sidewall 38 of second chamber 30.

With further reference to FIG. 17, a fluid conduit 40 connects first chamber 20 to second chamber 30. More specifically, fluid conduit 40 connects opening 26 of the first chamber 20 adjacent to the bottom 14 to opening 32 of the second chamber 30 adjacent to the top 12. By pressurizing the first chamber 20, such as by squeezing or pumping the chamber, fluid in the first chamber 20 is forced through fluid conduit 40 into the second chamber 30 where it can be dispensed through opening 34. In the embodiment shown in FIG. 20, fluid conduit 40 is substantially straight. However, the fluid conduit 40 also may include one or more bends, such as in the embodiment shown in FIG. 17. The fluid conduit 40 connects to the second chamber 30 adjacent to the top of the second chamber to reduce the risk of fluid in the second chamber 30 spilling back down the fluid conduit 40 and into the first chamber 20. The fluid conduit 40 may also include a one-way valve or other mechanism to further prevent backflow from the second chamber 30 into the first chamber 20.

In some embodiments, the first chamber 20 is larger than the second chamber 30, since the first chamber may be the primary fluid storage container. In addition, the chambers 20 and 30 may be configured to maximize container volume while minimizing the overall size of the multi-chamber container 10. For example, in some embodiments, the first chamber 20 may have one sloped sidewall, the second chamber 30 may have a substantially parallel sloped sidewall, and the fluid conduit 40 may be disposed in between these two sloped sidewalls.

Figure 20:
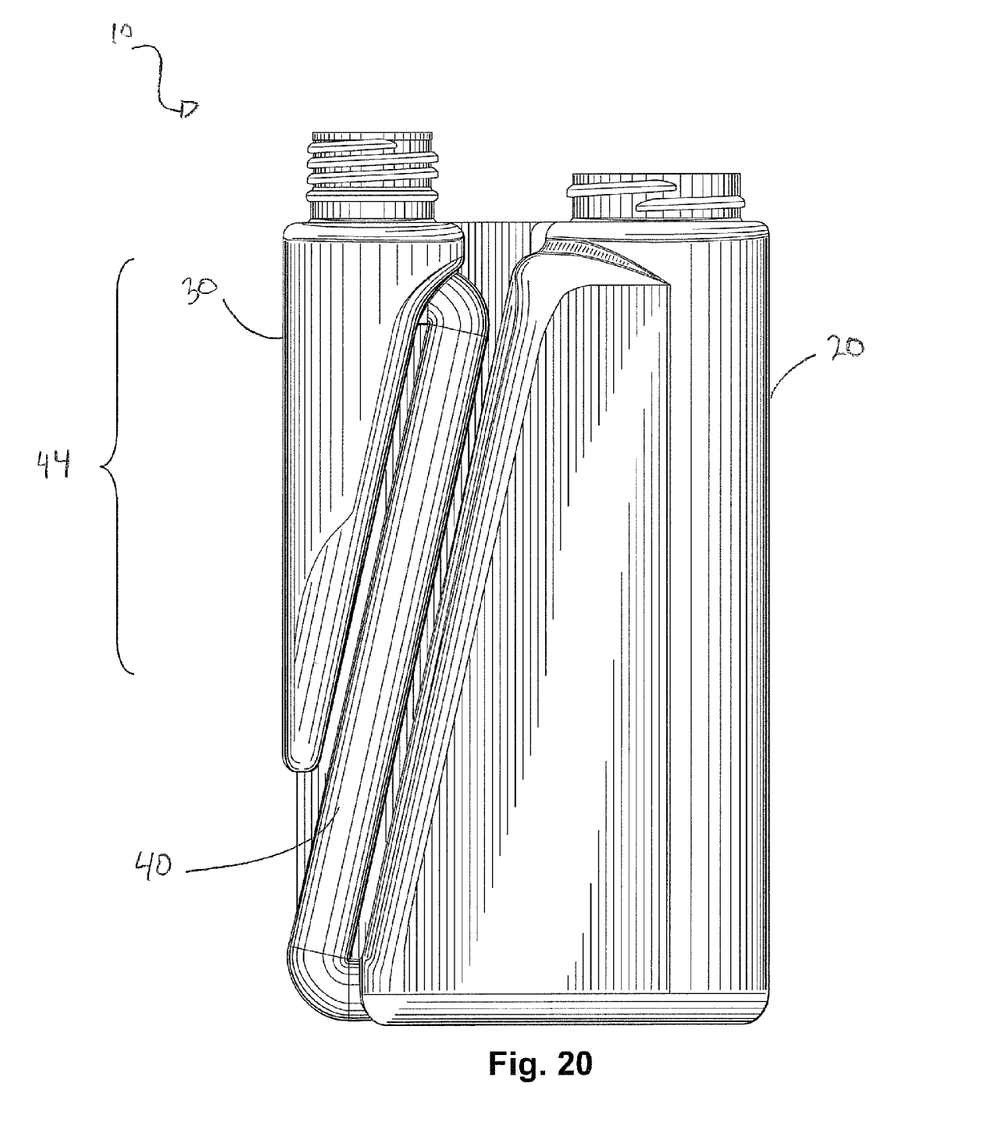
FIG. 20 shows a side plan view of a multi-chambered container according to an embodiment of the present invention having a straight fluid conduit.

In some embodiments, the multi-chambered container is configured to provide a graspable handle. Referring to FIG. 20, the second chamber 30 is smaller than the first chamber 20 and is sized and shaped to be graspable by a user's hand. In addition, fluid conduit 40, which is disposed between the first chamber 20 and the second chamber 30 as shown in FIG. 20, can have a smaller cross-sectional area than the second chamber 30 to provide a groove or depression (i.e., a finger-hold) for receiving the user's fingers. As a result, the user can comfortably hold, carry, and drink from the multi-chambered container 10 by grasping the handle portion 44 formed by second chamber 30 and fluid conduit 40.

The first chamber 20 may be designed to hold any amount of fluid, such as, for example, between about 8 ounces to about one gallon and, more preferably, between about 12 ounces to about 32 ounces. Likewise, the second chamber 30 may be configured to hold any amount of beverage, such as, for example, between about 1 ounce to about 8 ounces and, more preferably, between about 2 ounces to about 6 ounces. The second chamber 30 may include a fill line, which helps a user to keep fluid levels below the fluid conduit opening 32 to reduce the risk of fluid spilling back into the fluid conduit 40 and thus back into the first chamber 20.

In some embodiments, the multi-chambered container 10 is washable and thus reusable. Alternatively, the multi-chambered container 10 may be disposable.

The multi-chambered container may be constructed of any suitable material, such as, for example, plastic or metal. In some embodiments, the multi-chamber bottle comprises plastic and is manufactured by extrusion blow-molding a unitary multi-chambered container.

Figure 18:
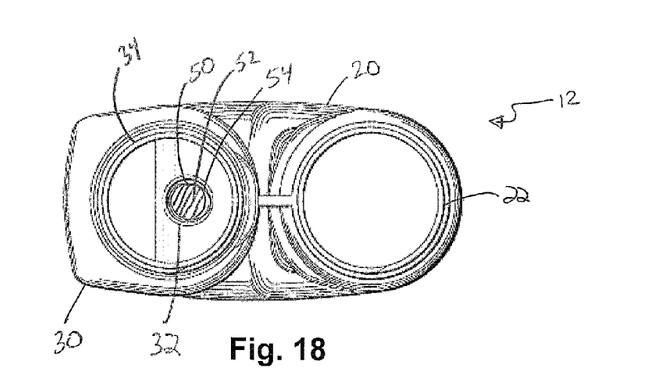
FIG. 18 shows a top plan view of the container of FIG. 17.

In some embodiments, the multi-chambered container 10 includes a filter 50 to remove contaminants from a beverage (FIG. 18). The filter 50 is particularly useful for filtering contaminants from water that affect its taste, quality and safety. Such contaminants include, but are not limited to, chlorine and metal particulates (which are the primary components of poor water taste), organic components, and microorganisms that can cause water borne illnesses. In some embodiments, filter 50 is a self-contained, removable filter cartridge disposed in opening 32 of the second chamber 30 and extending into fluid conduit 40. Any suitable filtration material can be used in the filter 50. By way of non-limiting example, the filtration material can include a film membrane, solids (e.g., activated carbon or resins), and combinations thereof.

The filtration cartridge can be manufactured using an inert material, such as, for example, polypropylene, to minimize or eliminate any reactions with the beverage. In addition, the filter cartridge housing can include a fitted bottom 52 to support and capture membranes and solids. The frit 52 can be molded, ultrasonically welded, or heat-sealed in place.

In some embodiments, the multi-chambered container 10 is configured to retain the filter 50 in the appropriate location. A holding mechanism 54 may be installed and welded into the fluid conduit 40 or near opening 32, and may have a snap or latch top to reversibly secure the filter 50 in place and to facilitate filter replacement. Alternatively, the holding mechanism 54 may be formed during the blow molding process.

Preferably, the filter and the holding mechanism 54 are configured to minimize fluid leaking around (i.e., by-passing) the filter 50 and to minimize the risk that the filter 50 is inadvertently dislodged, which may create a safety hazard.

Referring to FIG. 17, in accordance with an illustrative embodiment, a multi-chambered container 10 may have a bent or angled fluid conduit 40. A top portion of the fluid conduit 40 may be substantially vertical and connected to opening 32 of chamber 30 adjacent to the top 12, while a bottom portion of the fluid conduit 40 may be substantially parallel to the sloped sidewalls of the first chamber 20 and the second chamber 30. In some embodiments, the vertical section of the fluid conduit 40 facilitates filter cartridge placement.

With further reference to FIG. 17, the filter cartridge 50 can be located at the top of the fluid conduit 40, where the fluid conduit 40 connects to the opening 32 of the second chamber. In some embodiments, the filter cartridge 50 is at least partially disposed in opening 32 of the second chamber and in the top of the fluid conduit 40. Thus, the filter cartridge 50 filters the fluid as it flows into the second chamber 30 from the first chamber 20. By locating the filter cartridge 50 in the top of the fluid conduit 40, the filter cartridge 50 is also easily accessible for replacement.

Suitable filter materials can be tested for efficacy using methods known in the art. For example, solids and chemical analyses can be tested to determine the filtration materials' ability to maintain flow rates and to allow removal of turbidity, bacteria, color and other finely-divided matter, as well as chemicals such as chlorine and organics. The analytical methods employed can include, for example, HPLC, GC, and X-Ray diffraction, as well as microbiological analysis looking for normal water-borne pathogens such as *E. coli*, total coliforms, and bacteriophage MS-2.

In use, a user fills the first chamber 20 through opening 22 adjacent to the top 12. After placing and tightening the cap 24 on the first chamber 20, the user then pressurizes (e.g., squeezes) the first chamber 20 to force fluid through the fluid conduit 40 and into the second chamber 30. Fluid can then be dispensed through opening 34, which may be through a spout placed over opening 34.

The multi-chambered container 10 may include a clip, such as a carabiner, or a mount for a clip for attaching the bottle to a garment or bag. The multi-chambered container may also be insulated or configured to accept an insulator sleeve such as a neoprene sleeve.

In the foregoing description, the invention is generally discussed in the context of a multi-chamber container having two chambers. However, those skilled in the art will appreciate that the invention can include any suitable number of chambers without departing from the scope and spirit of the invention.

The use of headings and sections in the application is not meant to limit the invention; each section can apply to any aspect, embodiment, or feature of the invention.

Throughout the application, where apparatuses are described as having, including, or comprising specific components, or where processes are described as having, including or comprising specific process steps, it is contemplated that apparatuses of the invention also consist essentially of, or consist of, the recited components, and that the processes of the invention also consist essentially of, or consist of, the recited process steps.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the invention also includes the specific quantitative value itself, unless specifically stated otherwise.

It should be understood that the order of steps or order for performing certain actions is immaterial so long as the invention remains operable. Moreover, two or more steps or actions may be conducted simultaneously.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

What is claimed is:

1. A multi-chambered container having a top and bottom, the container comprising:
    a first chamber having a first opening disposed adjacent to the top through which fluid enters the first chamber and a second opening disposed adjacent to the bottom through which fluid flows out of the first chamber;
    a second chamber having a third opening disposed adjacent to the top through which fluid enters the second chamber and a fourth opening disposed adjacent to the top through which fluid is dispensed from the second chamber;
    the third opening oppposely facing the fourth opening, and the second chamber having a bottom distal the third and fourth openings;
    a fluid conduit including (i) a linear portion connected to the third opening and extending substantially perpendicular therefrom and (ii) a second portion angled from the linear portion and connected to the second opening;
    a holding mechanism disposed within the linear portion and removably attaching a filter cartridge to be positioned at least partially within the third opening and proximate the fourth opening;
    a one-way valve positioned within the fluid conduit to prevent backflow from the second chamber to the first chamber; and
    the container being squeezable to pressurize the first chamber, wherein fluid flows out of the first chamber through the removably attached filter cartridge and enters the second chamber upon pressurization of the first chamber.

2. The multi-chambered container of claim 1 wherein the second chamber is smaller than the first chamber, the fluid conduit is disposed between the first chamber and the second chamber, and the second chamber further comprises a graspable handle for the container.

3. The multi-chambered container of claim 1 wherein the fluid conduit second portion is linear.

4. The multi-chambered container of claim 1 wherein the fluid conduit includes at least one bend.

5. The multi-chambered container of claim 1 further comprising a first removable cap for covering the first opening of the first chamber.

6. The multi-chambered container of claim 1 further comprising a second removable cap for covering the fourth opening of the second chamber.

7. The multi-chambered container of claim 6 wherein the second removable cap comprises a nozzle mechanism.

8. The multi-chambered container of claim 1 wherein the container is made from a polymeric material.

9. A method for eliminating backflow of a liquid into a container utilizing the apparatus of claim 1, comprising the steps of:
   introducing a quantity of liquid into the first chamber of the container;
   applying a requisite amount of force to pressurize the first chamber to cause the quantity of liquid in the first chamber to flow through the conduit into the second chamber;
   securing the holding mechanism within the linear portion of the fluid conduit, the holding mechanism including a top to secure the filter cartridge; and
   dispensing the liquid through the fourth opening of the second chamber.

10. The method of claim 9 wherein the pressurizing includes pumping the first chamber.

11. The method of claim 9, further comprising the steps of: routing the quantity of liquid through the removeably attached filter cartridge located in the holding mechanism within the fluid conduit linear portion of the container.

12. A method for providing a metered quantity of liquid into a second chamber through a first chamber utilizing the apparatus of claim 1, comprising the steps of:
   providing a substantially flexible container;
   introducing a quantity of liquid into the first chamber;
   applying pressure to the first chamber;
   routing the quantity of liquid through a fluid conduit and a removeably attached filter cartridge into a second chamber;
   filling the second chamber to a predetermined level with the quantity of liquid; and
   releasing the first chamber.

* * * * *